G. D. BULMER.
VEHICLE WHEEL.
APPLICATION FILED OCT. 19, 1912.
1,059,026.
Patented Apr. 15, 1913.
2 SHEETS—SHEET 1.
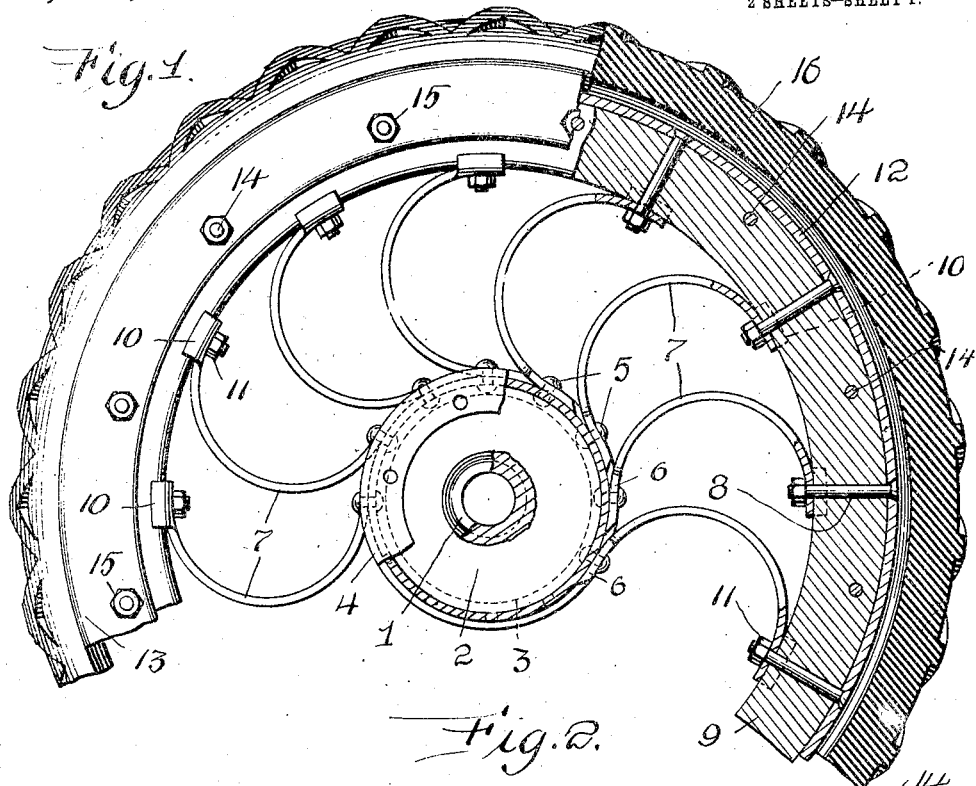
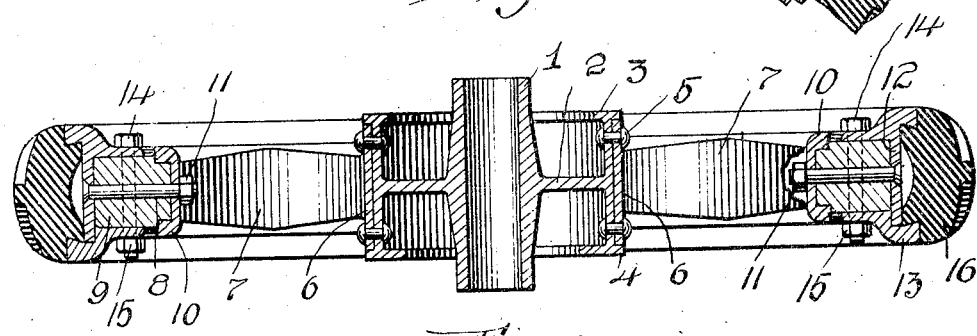
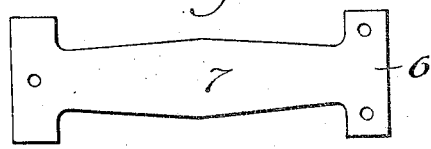
WITNESSES
Samuel Payne
X. H. Butler
INVENTOR
G. D. Bulmer
ATTORNEYS

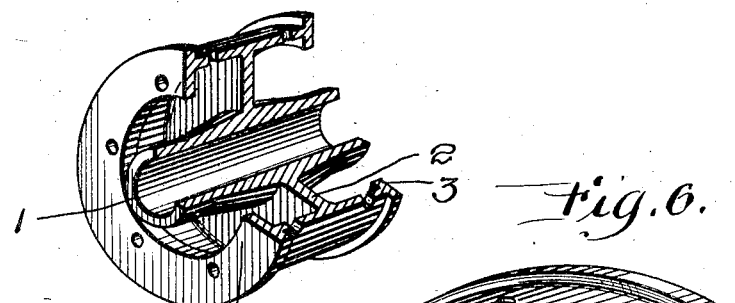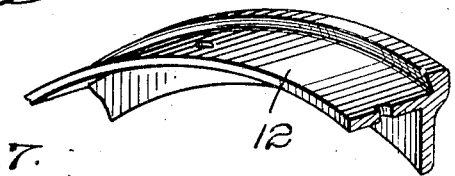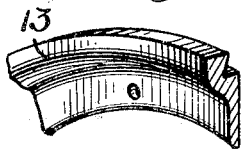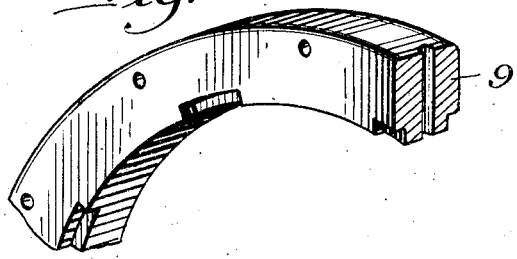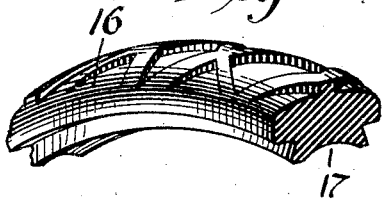

UNITED STATES PATENT OFFICE.

GEORGE D. BULMER, OF DUQUESNE, PENNSYLVANIA.

VEHICLE-WHEEL.

1,059,026.  Specification of Letters Patent.  Patented Apr. 15, 1913.

Application filed October 19, 1912. Serial No. 726,734.

*To all whom it may concern:*

Be it known that I, GEORGE D. BULMER, a citizen of the United States of America, residing at Duquesne, in the county of Allegheny and State of Pennsylvania, have invented certain new and useful Improvements in Vehicle-Wheels, of which the following is a specification, reference being had therein to the accompanying drawing.

This invention relates to vehicle wheels, and the objects of my invention are to provide a resilient wheel that can be advantageously used in connection with automobiles and other vehicles, and to provide an automobile wheel that obviates the necessity of using a pneumatic tire to cushion the body of an automobile.

Another object of this invention is to provide a metallic automobile wheel that has a spring-supported hub that can yield relatively to the periphery of the wheel and safely cushion the vibrations of an automobile body, and to provide a wheel of the above type with a novel tire holder that can be easily and quickly placed in position when a tire is to be replaced.

Further objects of my invention are to provide a strong and durable automobile wheel that will increase the roadworthiness of a motor driven machine, and to accomplish the above results by a mechanical construction that is inexpensive to manufacture, puncture-proof and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of a wheel partly broken away and partly in section, Fig. 2 is a cross sectional view of the same, Fig. 3 is a plan of a detached spring, Fig. 4 is a perspective view of the hub partly broken away and partly in section, Figs. 5 and 6 are perspective views of portions of tire holding members, Fig. 7 is a perspective view of a portion of the felly, and Fig. 8 is a perspective view of a portion of the tire.

A wheel in accordance with this invention comprises a metallic hub 1 having a peripheral web 2 intermediate the ends thereof that supports a sleeve 3 arranged circumferentially of the hub 1, said sleeve being of a less width than the length of the hub and having the ends thereof provided with peripheral flanges 4.

Riveted or otherwise connected, as at 5 to the sleeve 3 are the inner T-shaped ends 6 of curved springs 7 and the outer T-shaped ends of said spring are mounted upon the ends of bolts 8 radially disposed in a felly 9. The outer ends of the spring have side flanges 10 engaging the sides of the felly and said bolts are arranged in engagement with the felly by nuts 11. The bolts hold a tire member 12 upon the felly 9 and associated with said members is another tire member 13 that is detachable. The detachable member 13 is retained in engagement with the felly by a plurality of bolts 14 and nuts 15 screwed upon said bolts, the bolts 14 being arranged intermediate the bolts 8 in order not to impair the strength or rigidity of the felly. The members 12 and 13 constitute a holder for a tire 16 which is clamped between said members, said tire having a dove-tailed tongue 17 held by the edges of the members. The tongue 17 is concave and the periphery of the tire 16 has ribs to prevent the tire from skidding or slipping on smooth and wet surfaces.

The concave tongue permits of the tire being compressed to a degree which tends to bind the tongue 17 against the confronting beveled sides of the members 12 and 13. It is impossible for the tire to become accidentally displaced, and any suitable anti-skidding device can be used in connection with the tire.

With the inner ends of the springs permanently held between the flanges 4 of the sleeve 3 and the outer ends of the springs engaging the sides of the felly, the springs cannot become laterally displaced and the hub is yieldably held with all of the springs coöperating in supporting the hub normally concentric of the wheel.

While in the drawing there is illustrated a preferred embodiment of the invention, it is to be understood that the structural elements are susceptible to such variations and modifications as fall within the scope of the appended claim.

What I claim is:—

A vehicle wheel comprising a hub provided with a peripheral web, a peripherally flanged sleeve integral with the web, curved springs having T-shaped ends, the inner ends of said springs abutting against the flanges of said sleeve, means for fixedly securing the inner ends of the springs to said sleeve, a felly, the outer ends of said springs abutting against the felly and further bent to engage the sides of the felly, means for securing the outer ends of said springs to the felly, and a tire carried by the felly.

In testimony whereof I affix my signature in the presence of two witnesses.

GEORGE D. BULMER.

Witnesses:
   Thos. V. Jones,
   Wm. L. Evans.